US012177404B2

(12) United States Patent
Sano

(10) Patent No.: US 12,177,404 B2
(45) Date of Patent: *Dec. 24, 2024

(54) IMAGE DISPLAY SYSTEM, IMAGE DISPLAY METHOD, AND IMAGE DISPLAY PROGRAM

(71) Applicant: FOVE, Inc., Minato-ku (JP)

(72) Inventor: Genki Sano, Tokyo (JP)

(73) Assignee: FOVE, Inc., Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/817,200

(22) Filed: Mar. 12, 2020

(65) Prior Publication Data
US 2020/0213467 A1 Jul. 2, 2020

Related U.S. Application Data

(63) Continuation of application No. 16/038,302, filed on Jul. 18, 2018, now Pat. No. 10,735,620.

(30) Foreign Application Priority Data

Sep. 29, 2017 (JP) ................. 2017-190591

(51) Int. Cl.
H04N 1/21 (2006.01)
G06T 15/00 (2011.01)
G11B 20/10 (2006.01)
H04N 5/14 (2006.01)
H04N 5/76 (2006.01)
H04N 5/77 (2006.01)
H04N 9/804 (2006.01)
G02B 27/01 (2006.01)

(52) U.S. Cl.
CPC ............ H04N 1/212 (2013.01); G06T 15/00 (2013.01); G11B 20/10527 (2013.01); H04N 5/144 (2013.01); H04N 5/76 (2013.01); H04N 5/772 (2013.01); H04N 9/804 (2013.01); G02B 27/01 (2013.01)

(58) Field of Classification Search
CPC ........ G06T 15/00; H04N 1/212; H04N 5/772; H04N 9/804; G11B 20/10527
USPC ................................. 345/419, 173; 348/705
See application file for complete search history.

(56) References Cited

U.S. PATENT DOCUMENTS 9,342,147 B2 * 5/2016 Wilairat .................. G06F 3/013
2011/0032252 A1 * 2/2011 Ohta ....................... G09G 3/003
345/419

(Continued)

Primary Examiner — Trang U Tran

(57) ABSTRACT

Moving images are switched naturally when development of a story is switched according to a situation. An image display system includes a display unit that displays a moving image, an acquisition unit that acquires a motion of a user viewing the moving image displayed by the display unit, a determination unit that determines whether or not the motion of the user acquired by the acquisition unit satisfies a predetermined switching condition in which the user does not recognize switching between images even when the moving image displayed by the display unit is switched from first moving image data to second moving image data different from the first moving image, and a switching unit that switches the moving image displayed by the display unit from the first moving image data to the second moving image data when the determination unit determines that the switching condition is satisfied.

9 Claims, 11 Drawing Sheets

(56) References Cited

U.S. PATENT DOCUMENTS

| | | | |
|---|---|---|---|
| 2013/0259312 A1* | 10/2013 | Lyons | H04N 21/4223 |
| | | | 382/103 |
| 2015/0241926 A1* | 8/2015 | Park | G06F 3/016 |
| | | | 345/173 |
| 2017/0212583 A1* | 7/2017 | Krasadakis | G06F 3/0485 |
| 2018/0184000 A1* | 6/2018 | Lee | H04N 23/698 |

* cited by examiner

212 DETERMINATION CONDITION DATA

| DETERMINATION CONDITION | SWITCHED MOVING IMAGE |
|---|---|
| REGION A IS VIEWED | MOVING IMAGE A |
| REGION B IS VIEWED | MOVING IMAGE B |

(b)

213 DETERMINATION CONDITION DATA

| TIMING | THRESHOLD VALUE |
|---|---|
| PERIOD $\alpha$ | FIRST THRESHOLD VALUE (MOTION OF GAZE)<br>SECOND THRESHOLD VALUE (MOTION OF HEAD)<br>THIRD THRESHOLD VALUE (IMAGE CHANGE AMOUNT) |

(c)

213 SWITCHING CONDITION DATA

| TIMING | THRESHOLD VALUE |
|---|---|
| PERIOD $\alpha$<br>PERIOD $\beta$ | FIRST THRESHOLD VALUE (MOTION OF GAZE)<br>SECOND THRESHOLD VALUE (MOTION OF HEAD)<br>THIRD THRESHOLD VALUE (IMAGE CHANGE AMOUNT) |

FIG. 9
(a) 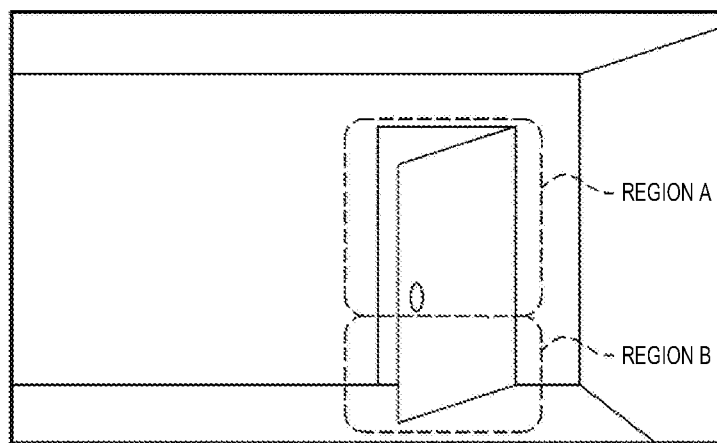
(b) 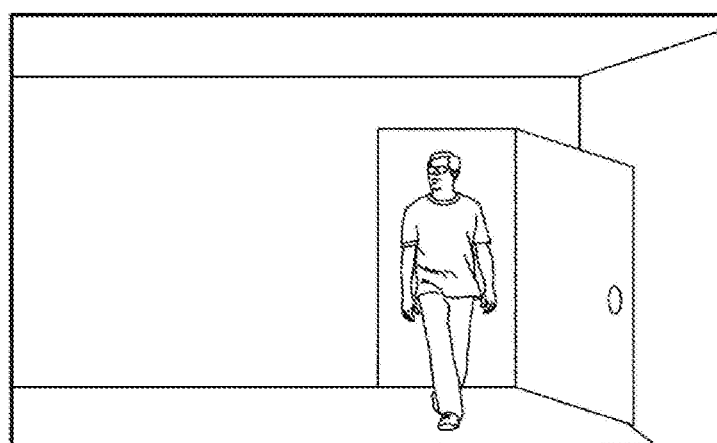
(c) 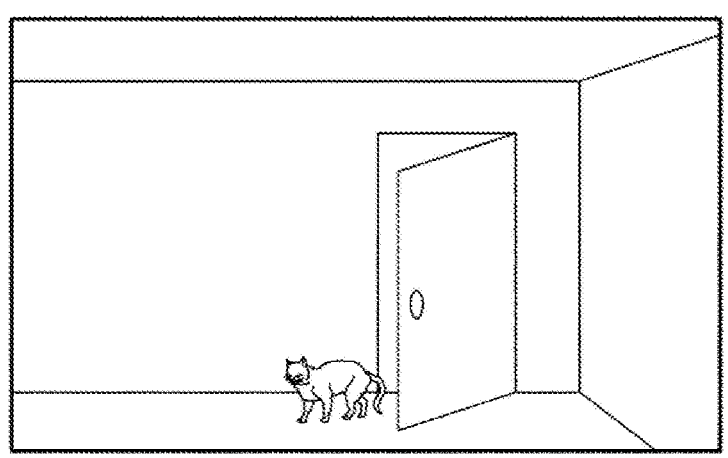

FIG. 10
(a)
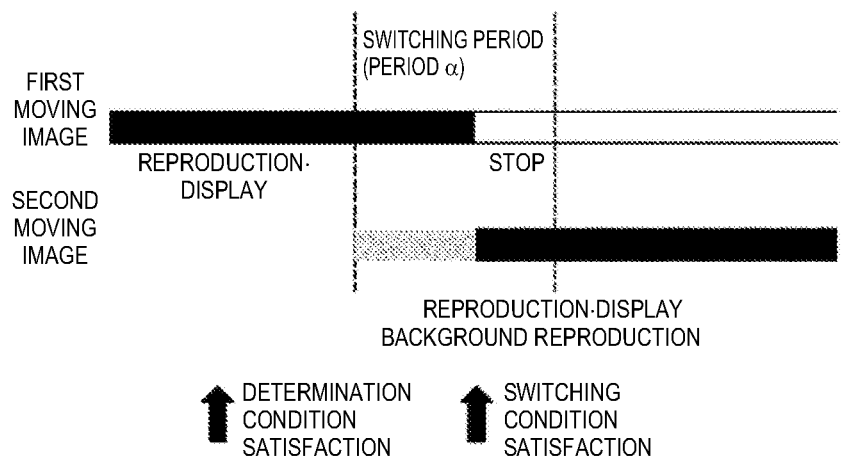
(b)
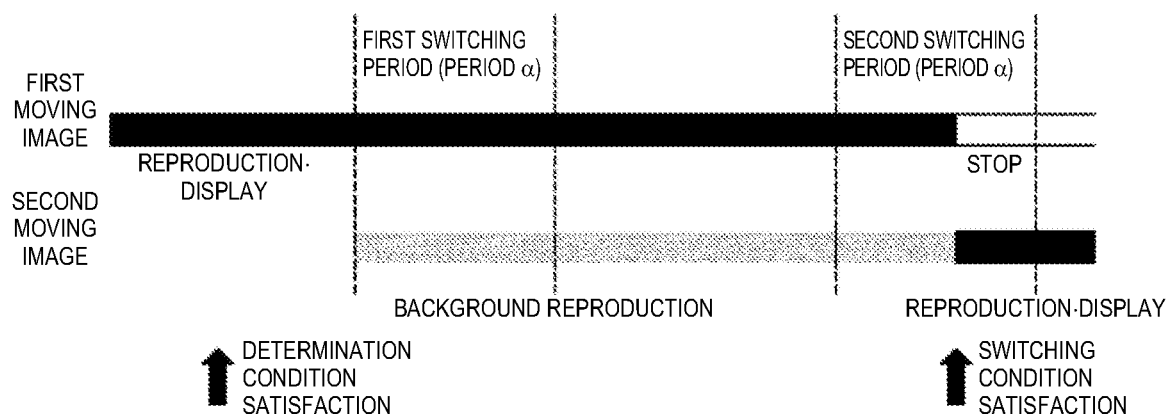

IMAGE DISPLAY SYSTEM, IMAGE DISPLAY METHOD, AND IMAGE DISPLAY PROGRAM

BACKGROUND OF THE INVENTION

Field of the Invention

The present invention relates to an image display system, an image display method, and an image display program, and more particularly, to an image display system, an image display method, and an image display program using a head mounted display.

Description of Related Art

In recent years, with the development of moving image capturing technology and recording media, flexibility in reproduction methods is also being required. For example, a technology for preventing interruption or disturbance of a reproduced video from occurring when branching from a branch portion of a stem story to a plurality of branch scenes is performed in a case in which data of a plurality of stories or scenes is recorded has been developed (see Japanese Unexamined Patent Application Publication Nos. H10-27461 and H10-255443).

Meanwhile, a video of a plurality of scenes is prepared and development of the story is switched according to a viewing situation of a user, such that the user can enjoy a story suitable for the user. Here, when the development of the story is switched, the user can recognize that the moving image has been switched in a case in which switching of a moving image is unnatural. When the switching of the moving image is recognized, the user, for example, does not concentrate on the story and cannot fully enjoy the story.

SUMMARY OF THE INVENTION

The present invention has been made in view of the above problems, and an object of the present invention is to prepare a video of a plurality of scenes and switch between moving images naturally when development of a story is switched according to a situation.

In order to resolve the above problem, an image display system according to the present invention includes a display unit that displays a moving image; an acquisition unit that acquires a motion of a user viewing the moving image displayed by the display unit; a determination unit that determines whether or not the motion of the user acquired by the acquisition unit satisfies a predetermined switching condition in which the user does not recognize switching between images even when the moving image displayed by the display unit is switched from first moving image data to second moving image data different from the first moving image; and a switching unit that switches the moving image displayed by the display unit from the first moving image data to the second moving image data when the determination unit determines that the switching condition is satisfied.

According to the present invention, it is possible to switch between moving images naturally when development of a story is switched according to a situation.

DETAILED DESCRIPTION OF THE INVENTION

FIG. 7 is a data configuration diagram illustrating a configuration of data for use in the image display system;

FIG. 9 illustrates an example of an image illustrating an image displayed in the image display system.

FIG. 10 is a time chart illustrating a switching timing for a moving image in the image display system.

DETAILED DESCRIPTION OF THE INVENTION

<Configuration>

Figure 1:
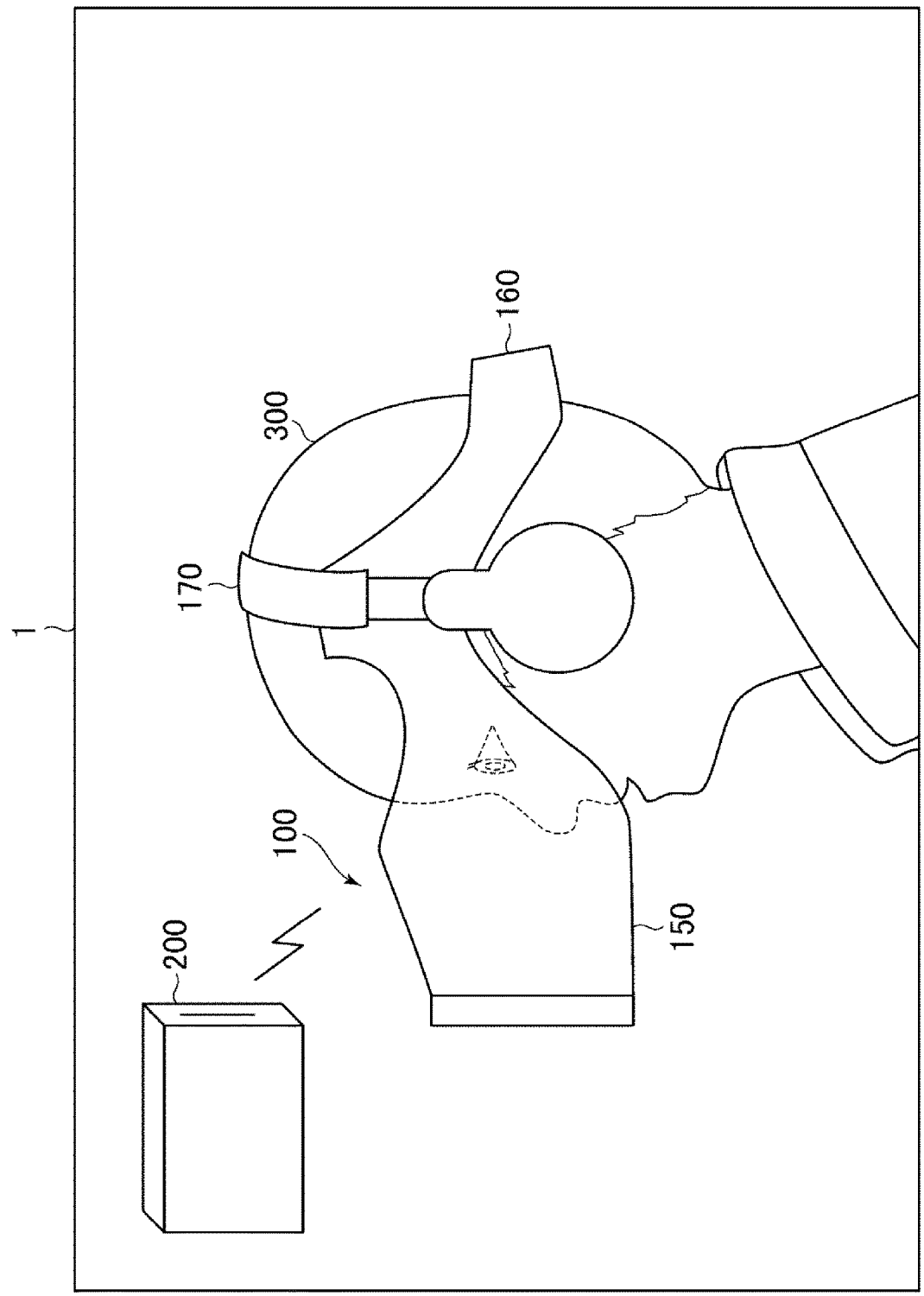
FIG. 1 is an external view illustrating a state in which a user wears a head mounted display.

FIG. 1 is a diagram schematically illustrating an overview of a image display system 1. The image display system 1 includes a head mounted display 100 and a gaze detection device 200. As illustrated in FIG. 1, the head mounted display 100 is mounted on a head of a user 300 for use.

The gaze detection device 200 detects a gaze direction of at least one of right and left eyes of the user wearing the head mounted display 100, and specifies a focal point of the user, that is, a gaze point of the user in a three-dimensional image displayed on the head mounted display. Further, the gaze detection device 200 also functions as a video generation device that generates videos displayed by the head mounted display 100. For example, the gaze detection device 200 is a device capable of reproducing videos of stationary game machines, portable game machines, PCs, tablets, smartphones, phablets, video players, TVs, or the like, but the present invention is not limited thereto. The gaze detection device 200 is wirelessly or wiredly connected to the head mounted display 100. In the example illustrated in FIG. 1, the gaze detection device 200 is wirelessly connected to the head mounted display 100. The wireless connection between the gaze detection device 200 and the head mounted display 100 can be realized using a known wireless communication technique such as Wi-Fi (registered trademark) or Bluetooth (registered trademark). For example, transfer of videos between the head mounted display 100 and the gaze detection device 200 is executed according to a standard such as Miracast (registered trademark), WiGig (registered trademark), or WHDI (registered trademark).

FIG. 1 illustrates an example in which the head mounted display 100 and the gaze detection device 200 are different devices. However, the gaze detection device 200 may be built into the head mounted display 100.

The head mounted display 100 includes a housing 150, a fitting harness 160, and headphones 170. The housing 150 houses an image display system, such as an image display element, for presenting videos to the user 300, and a wireless transfer module (not illustrated) such as a Wi-Fi module or a Bluetooth (registered trademark) module. The fitting harness 160 is used to mount the head mounted display 100 on the head of the user 300. The fitting harness 160 may be realized by, for example, a belt or an elastic band. When the user 300 wears the head mounted display 100 using the fitting harness 160, the housing 150 is arranged at a position where the eyes of the user 300 are covered. Thus, when the user 300 wears the head mounted display 100, a field of view of the user 300 is covered by the housing 150.

The headphones 170 output audio for the video that is reproduced by the gaze detection device 200. The headphones 170 may not be fixed to the head mounted display 100. Even when the user 300 wears the head mounted display 100 using the fitting harness 160, the user 300 may freely attach or detach the headphones 170.

Figure 2:
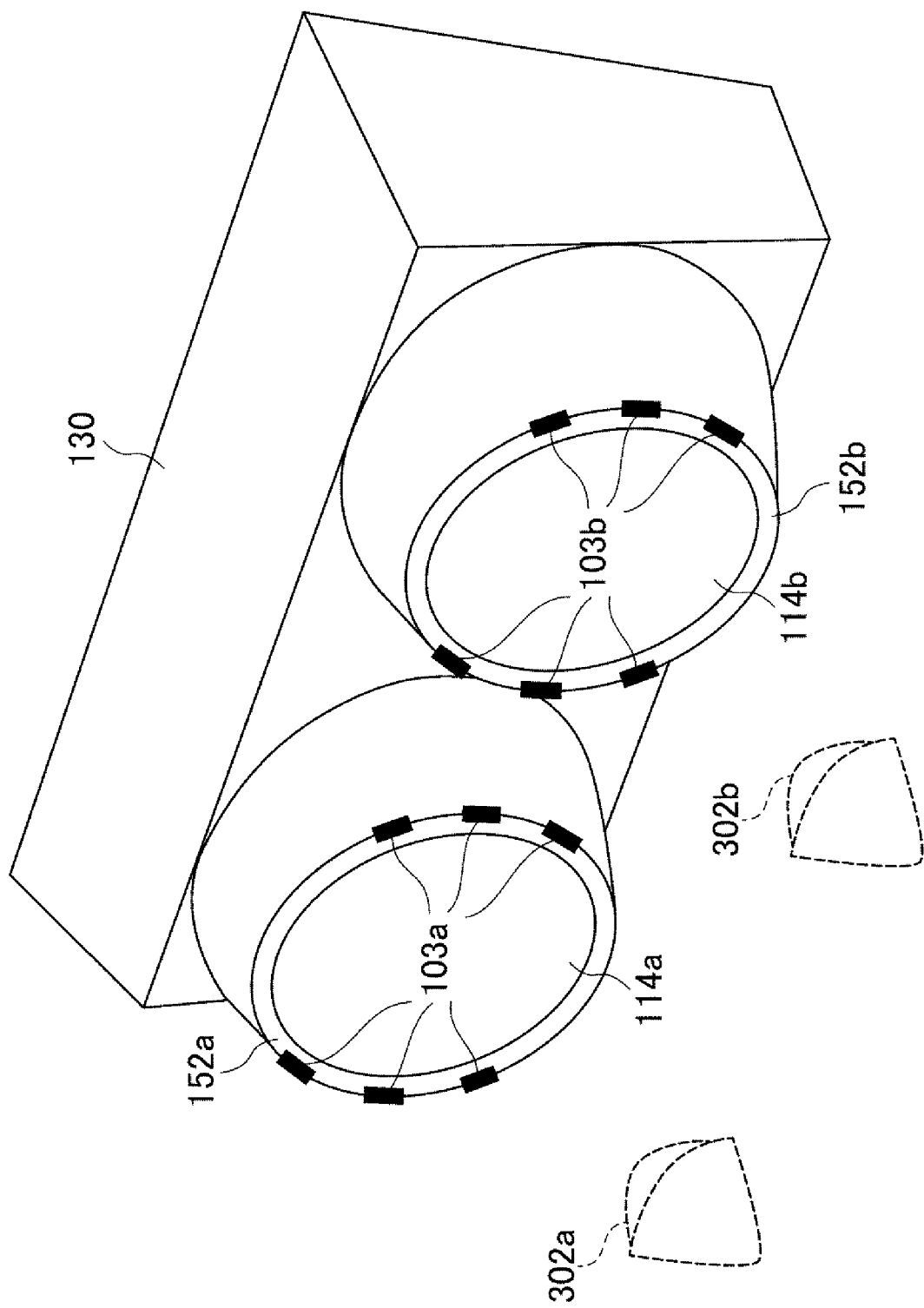
FIG. 2 is a perspective view schematically illustrating an overview of an image display system of the head mounted display.

FIG. 2 is a perspective diagram illustrating an overview of the image display system 130 of the head mounted display 100. Specifically, FIG. 2 illustrates a region of the housing 150 that faces corneas 302 of the user 300 when the user 300 wears the head mounted display 100.

As illustrated in FIG. 2, a convex lens 114a for the left eye is arranged at a position facing the cornea 302a of the left eye of the user 300 when the user 300 wears the head mounted display 100. Similarly, a convex lens 114b for a right eye is arranged at a position facing the cornea 302b of the right eye of the user 300 when the user 300 wears the head mounted display 100. The convex lens 114a for the left eye and the convex lens 114b for the right eye are gripped by a lens holder 152a for the left eye and a lens holder 152b for the right eye, respectively.

Hereinafter, in this specification, the convex lens 114a for the left eye and the convex lens 114b for the right eye are simply referred to as a "convex lens 114" unless the two lenses are particularly distinguished. Similarly, the cornea 302a of the left eye of the user 300 and the cornea 302b of the right eye of the user 300 are simply referred to as a "cornea 302" unless the corneas are particularly distinguished. The lens holder 152a for the left eye and the lens holder 152b for the right eye are referred to as a "lens holder 152" unless the holders are particularly distinguished.

A plurality of infrared light sources 103 are included in the lens holders 152. For the purpose of brevity, in FIG. 2, the infrared light sources that irradiate the cornea 302a of the left eye of the user 300 with infrared light are collectively referred to as infrared light sources 103a, and the infrared light sources that irradiate the cornea 302b of the right eye of the user 300 with infrared light are collectively referred to as infrared light sources 103b. Hereinafter, the infrared light sources 103a and the infrared light sources 103b are referred to as "infrared light sources 103" unless the infrared light sources 103a and the infrared light sources 103b are particularly distinguished. In the example illustrated in FIG. 2, six infrared light sources 103a are included in the lens holder 152a for the left eye. Similarly, six infrared light sources 103b are included in the lens holder 152b for the right eye. Thus, the infrared light sources 103 are not directly arranged in the convex lenses 114, but are arranged in the lens holders 152 that grip the convex lenses 114, making the attachment of the infrared light sources 103 easier. This is because machining for attaching the infrared light sources 103 is easier than for the convex lenses 114 that are made of glass or the like since the lens holders 152 are typically made of a resin or the like.

As described above, the lens holders 152 are members that grip the convex lenses 114. Therefore, the infrared light sources 103 included in the lens holders 152 are arranged around the convex lenses 114. Although there are six infrared light sources 103 that irradiate each eye with infrared light herein, the number of the infrared light sources 103 is not limited thereto. There may be at least one light source 103 for each eye, and two or more light sources 103 are desirable.

Figure 3:
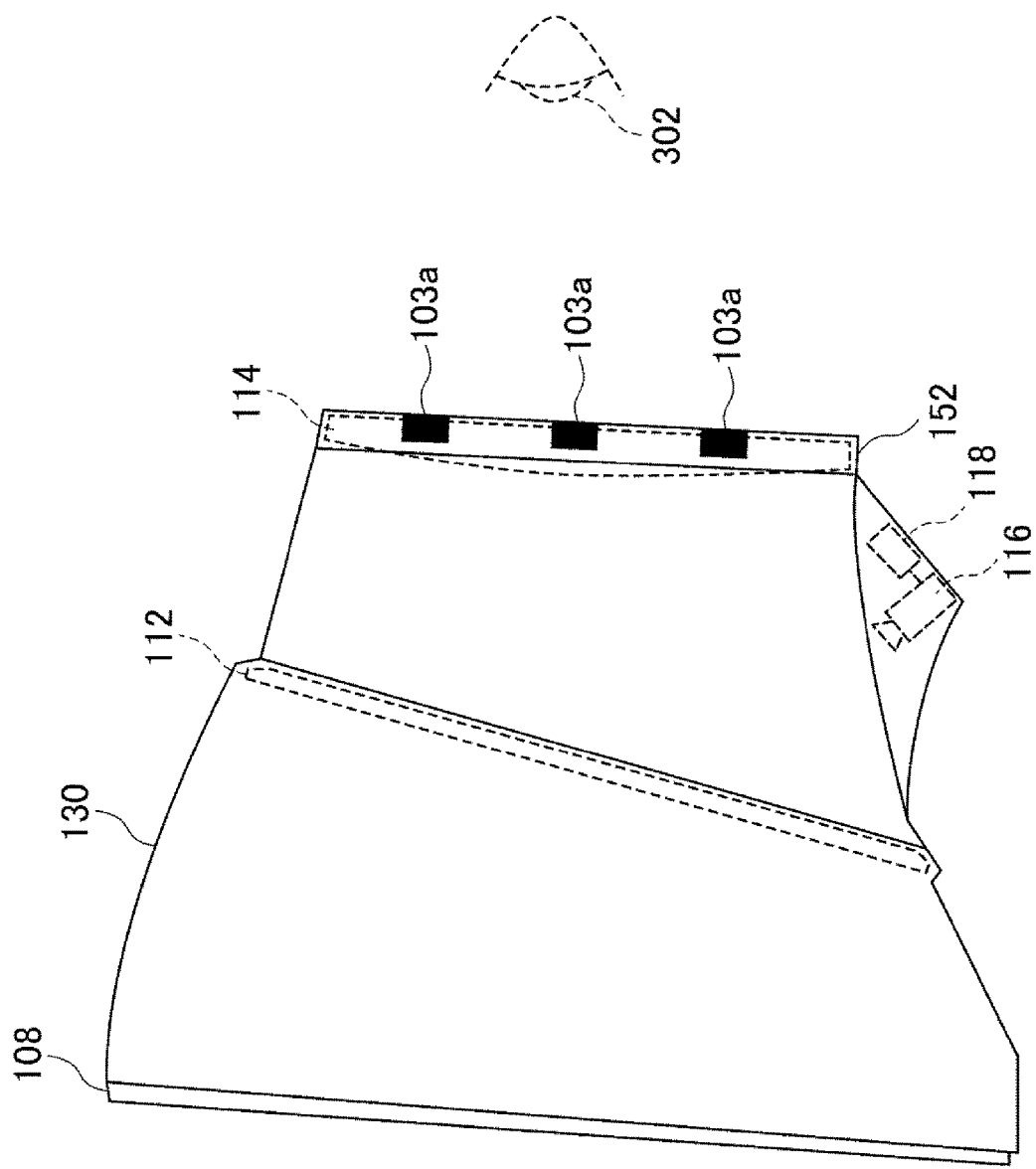
FIG. 3 is a diagram schematically illustrating an optical configuration of an image display system of the head mounted display.

FIG. 3 is a schematic diagram of an optical configuration of the image display system 130 contained in the housing 150, and is a diagram illustrating a case in which the housing 150 illustrated in FIG. 2 is viewed from a side surface on the left eye side. The image display system 130 includes infrared light sources 103, an image display element 108, a hot mirror 112, the convex lenses 114, a camera 116, and a first communication unit 118.

The infrared light sources 103 are light sources capable of emitting light in a near-infrared wavelength region (700 nm to 2500 nm range). Near-infrared light is generally light in a wavelength region of non-visible light that cannot be observed by the naked eye of the user 300.

The image display element 108 displays an image to be presented to the user 300. The image to be displayed by the image display element 108 is provided from the gaze detection device 200. The image display element 108 can be realized by using an existing liquid crystal display (LCD) or organic electro luminescence display (OLED).

The hot mirror 112 is arranged between the image display element 108 and the cornea 302 of the user 300 when the user 300 wears the head mounted display 100. The hot mirror 112 has a property of transmitting visible light created by the image display element 108, but reflecting near-infrared light.

The convex lenses 114 are arranged on the opposite side of the image display element 108 with respect to the hot mirror 112. In other words, the convex lenses 114 are arranged between the hot mirror 112 and the cornea 302 of the user 300 when the user 300 wears the head mounted display 100. That is, the convex lenses 114 are arranged at positions facing the corneas 302 of the user 300 when the user 300 wears the head mounted display 100.

The convex lenses 114 condense image display light that is transmitted through the hot mirror 112. Thus, the convex lenses 114 function as image magnifiers that enlarge an image created by the image display element 108 and present the image to the user 300. Although only one of each convex lens 114 is illustrated in FIG. 2 for convenience of description, the convex lenses 114 may be lens groups configured by combining various lenses or may be a plano-convex lens in which one surface has curvature and the other surface is flat.

A plurality of infrared light sources 103 are arranged around the convex lens 114. The infrared light sources 103 emit infrared light toward the cornea 302 of the user 300.

Although not illustrated in the figure, the image display system 130 of the head mounted display 100 includes two image display elements 108 and can independently generate an image to be presented to the right eye of the user 300 and an image to be presented to the left eye of the user. Accordingly, the head mounted display 100 can present a parallax image for the right eye and a parallax image for the left eye to the right and left eyes of the user 300. Thereby, the head mounted display 100 can present a stereoscopic video that has a feeling of depth to the user 300.

The infrared light reaching the cornea 302 of the user 300 is reflected by the cornea 302 of the user 300 and is directed to the convex lens 114 again. This infrared light is transmitted through the convex lens 114 and is reflected by the hot mirror 112. The camera 116 includes a filter that blocks visible light and images the near-infrared light reflected by the hot mirror 112. That is, the camera 116 is a near-infrared camera which images the near-infrared light emitted from the infrared light sources 103 and reflected by the cornea of the eye of the user 300.

Although not illustrated in the figure, the image display system 130 of the head mounted display 100 includes two cameras 116, that is, a first imaging unit that captures an image including the infrared light reflected by the right eye and a second imaging unit that captures an image including the infrared light reflected by the left eye. Thereby, images for detecting gaze directions of both the right eye and the left eye of the user 300 can be acquired.

The first communication unit 118 outputs the image captured by the camera 116 to the gaze detection device 200 that detects the gaze direction of the user 300. Specifically, the first communication unit 118 transmits the image captured by the camera 116 to the gaze detection device 200. Although the gaze detection unit 202 functioning as a gaze direction detection unit will be described below in detail, the gaze direction unit is realized by an image display program executed by a central processing unit (CPU) of the gaze detection device 200. When the head mounted display 100 includes computational resources such as a CPU or a memory, the CPU of the head mounted display 100 may execute the program that realizes the gaze direction detection unit.

As will be described below in detail, bright spots caused by near-infrared light reflected by the cornea 302 of the user 300 and an image of the eyes including the cornea 302 of the user 300 observed in a near-infrared wavelength region are captured in the image captured by the camera 116.

Although the configuration for presenting the image to the left eye of the user 300 in the image display system 130 has mainly been described above, a configuration for presenting an image to the right eye of the user 300 is the same as above.

Figure 4:
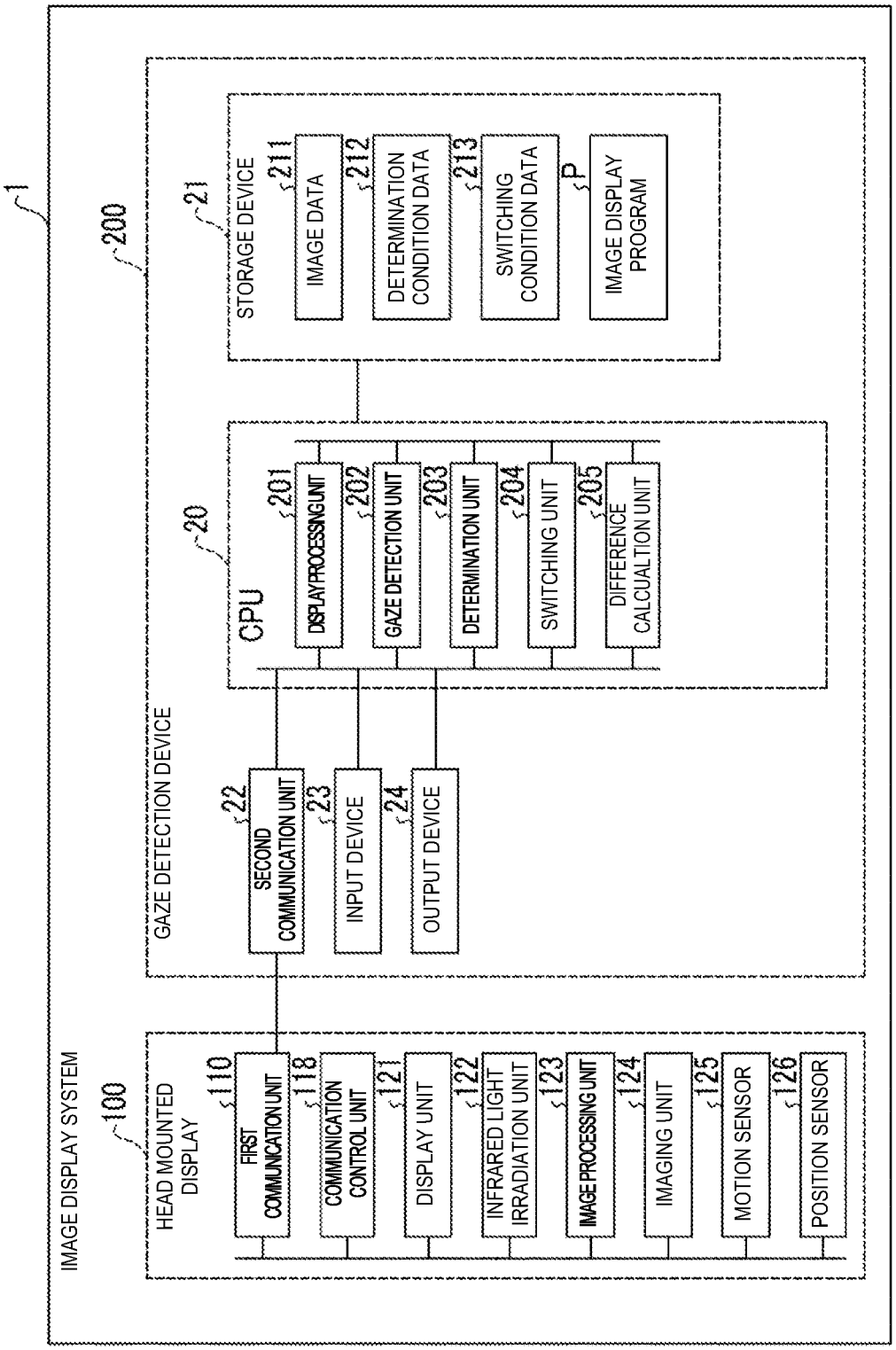
FIG. 4 is a block diagram illustrating a configuration of an image display system.

FIG. 4 is a block diagram of the head mounted display 100 and the gaze detection device 200 according to the image display system 1. As illustrated in FIG. 4, and as described above, the image display system 1 includes the head mounted display 100 and the gaze detection device 200 which communicate with each other.

As illustrated in FIG. 4, the head mounted display 100 includes the first communication unit 118, a display unit 121, an infrared light irradiation unit 122, an image processing unit 123, an imaging unit 124, a motion sensor 125, and a position sensor 126.

The first communication unit 118 is a communication interface having a function of communicating with a second communication unit 22 of the gaze detection device 200. As described above, the first communication unit 118 communicates with the second communication unit 22 through wired or wireless communication. Examples of usable communication standards are as described above. The first communication unit 118 transmits image data to be used for gaze detection transferred from the imaging unit 124 or the image processing unit 123 to the second communication unit 22. Further, the first communication unit 118 transfers image data or a marker image transmitted from the gaze detection device 200 to the display unit 121. The image data is, for example, moving image data with a story. For example, the image data may be a moving image such as a movie, may be a moving image such as a video game, or may be a moving image such as a landscape video. Further, the image data may be a parallax image pair including a right-eye parallax image and a left-eye parallax image for displaying a three-dimensional image. Further, the image data may be moving image data of an all sky image of 360°.

The display unit 121 has a function of displaying the image data transferred from the first communication unit 118 on the image display element 108. Further, the display unit 121 displays a marker image output from a display processing unit 201 at designated coordinates of the image display element 108.

The infrared light irradiation unit 122 controls the infrared light sources 103 and irradiates the right eye or the left eye of the user with infrared light.

The image processing unit 123 performs image processing on the image captured by the imaging unit 124, as necessary, and transfers a processed image to the first communication unit 118.

The imaging unit 124 captures an image of near-infrared light reflected by each eye using the camera 116. Further, the imaging unit 124 captures an image including the eyes of the user gazing at the marker image displayed on the image display element 108. The imaging unit 124 transfers the image obtained by the imaging to the first communication unit 118 or the image processing unit 123.

The motion sensor 125 is a sensor that detects a slope of the head mounted display 100, that is, a slope of the head of the user. The motion sensor 125 is realized by, for example, an acceleration sensor or a gyro sensor. The motion sensor 125 sequentially detects the slope of the head mounted display 100 and transfers the slope to the first communication unit 118. For example, when the motion sensor 125 is a gyro sensor, the motion sensor 125 transfers a rotation angle (roll, pitch, and yaw) of the head mounted display 100 to the first communication unit 118. It should be noted that the rotation angle is transmitted to the gaze detection device 200 via the first communication unit 118.

The position sensor 126 is a sensor that detects a position of the head mounted display 100, that is, a position of the head of the user wearing the head mounted display 100. The position sensor 126 sequentially detects three-dimensional coordinates (x, y, z) as a position of the head mounted display 100 and transfers the three-dimensional coordinates to the first communication unit 118. It should be noted that the three-dimensional coordinates are transmitted to the gaze detection device 200 via the first communication unit 118.

The above is the description of the configuration of the head mounted display 100.

As illustrated in FIG. 4, the gaze detection device 200 includes a central processing unit (CPU) 20, a storage device 21, the second communication unit 22, an input device 23, and an output device 24.

The storage device 21 is a recording medium that stores various programs and data that is required for an operation of the gaze detection device 200. Specifically, the storage device 21 stores image data 211 to be provided to the head mounted display 100, determination condition data 212 as to whether or not to execute a determination for image switching, switching condition data 213 that is an image switching condition, and an image display program P that realizes the gaze detection device 200.

In the storage device 21, image data 211 for a plurality of patterns of stories associated with the switching condition is stored. In addition, by reading and executing the image display program P stored in the storage device 21, the CPU 20 executes processes of the display processing unit 201, the gaze detection unit 202, the determination unit 203, the switching unit 204, and the difference calculation unit 205. It should be noted that the storage device 21 is realized by, for example, a hard disk drive (HDD) or a solid state drive (SSD).

Next, detection of a gaze direction will be described.

Figure 5:
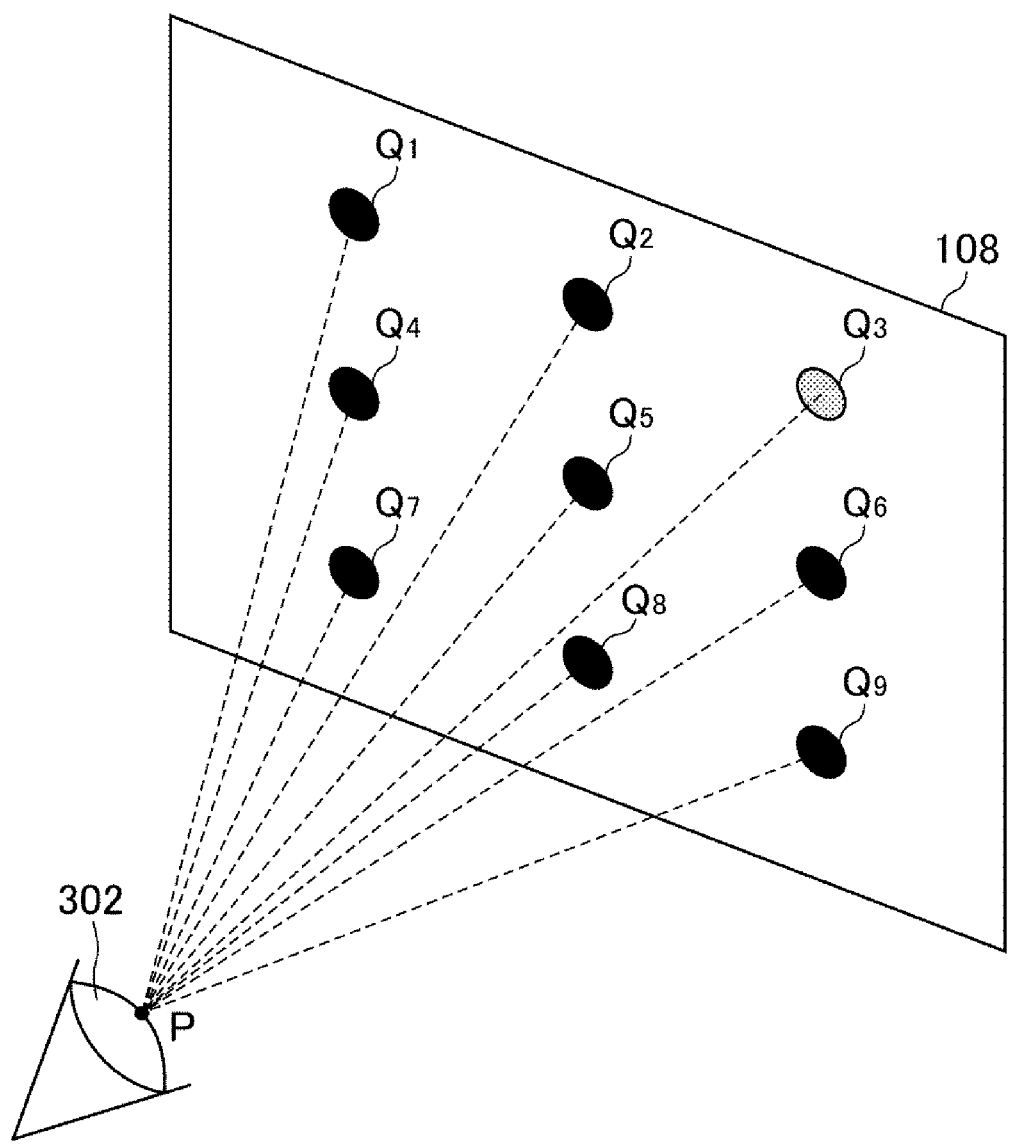
FIG. 5 is a schematic diagram illustrating calibration for detection of a gaze direction.

FIG. 5 is a schematic diagram illustrating calibration for detection of the gaze direction. The gaze direction of the user 300 is realized by the gaze detection unit 202 in the gaze detection device 200 analyzing the video captured by the camera 116 and output to the gaze detection device 200 by the first communication unit 118.

The display processing unit 201 causes the image display element 108 of the head mounted display 100 to display nine points (marker images) including points $Q_1$ to $Q_9$ as illustrated in FIG. 5. The gaze detection device 200 causes the user 300 to sequentially gaze at the points $Q_1$ up to $Q_9$. In this case, the user 300 is requested to gaze at each of the points by moving his or her eyeballs as much as possible without moving his or her neck. The camera 116 captures images including the cornea 302 of the user 300 when the user 300 is gazing at the nine points including the points $Q_1$ to $Q_9$.

Figure 6:
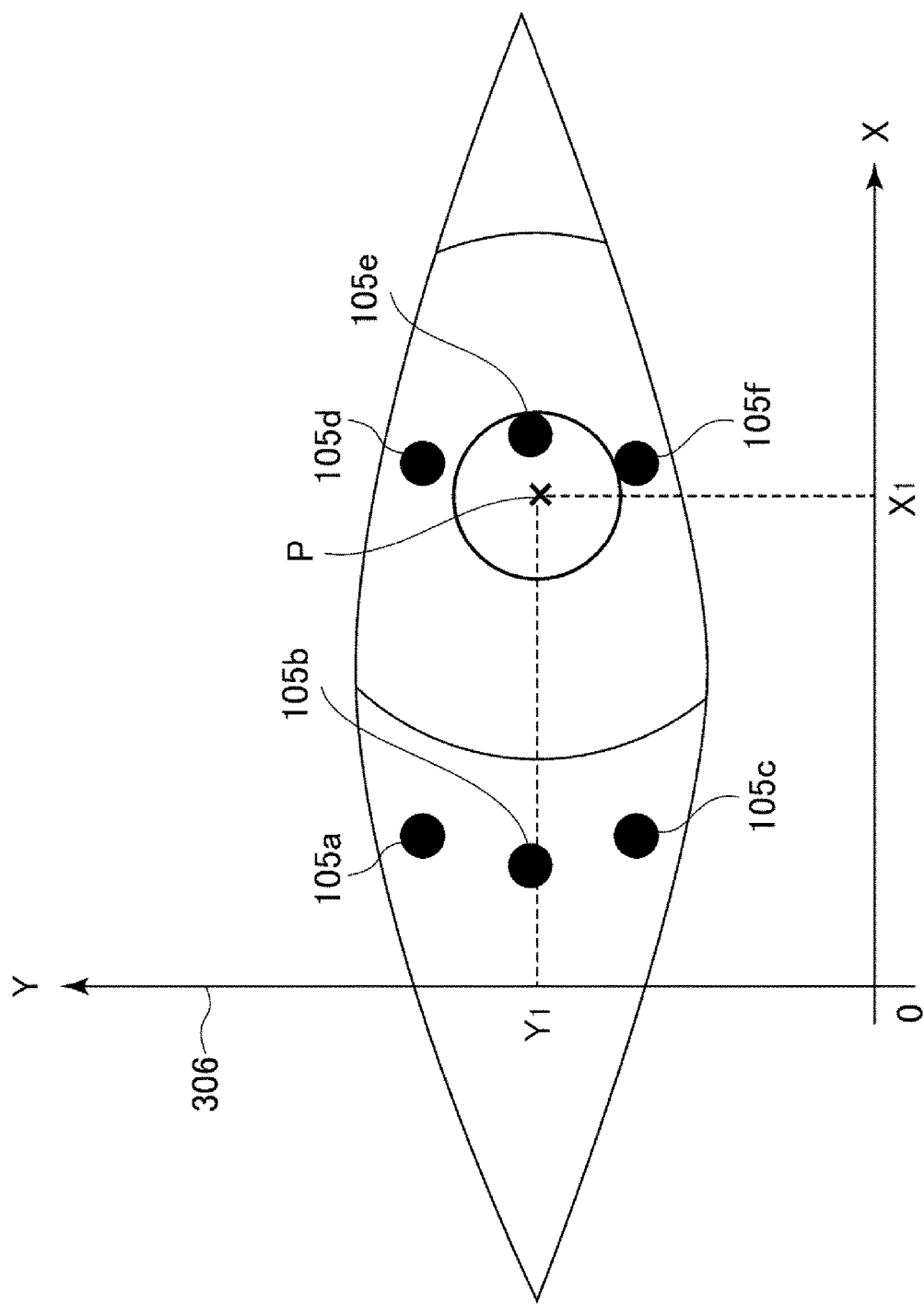
FIG. 6 is a schematic diagram illustrating position coordinates of a cornea of a user.

FIG. 6 is a schematic diagram illustrating the position coordinates of the cornea 302 of the user 300. The gaze detection unit 202 in the gaze detection device 200 analyzes the images captured by the camera 116 and detects bright spots 105 derived from the infrared light. When the user 300 gazes at each point by moving only his or her eyeballs, the positions of the bright spots 105 are considered to be stationary regardless of the point at which the user gazes. Thus, on the basis of the detected bright spots 105, the gaze detection unit 202 sets a two-dimensional coordinate system 306 in the image captured by the camera 116.

Further, the gaze detection unit 202 detects the center P of the cornea 302 of the user 300 by analyzing the image captured by the camera 116. This is realized by using known image processing such as the Hough transform or an edge extraction process. Accordingly, the gaze detection unit 202 can acquire the coordinates of the center P of the cornea 302 of the user 300 in the set two-dimensional coordinate system 306.

In FIG. 5, the coordinates of the points $Q_1$ to $Q_9$ in the two-dimensional coordinate system set for the display screen displayed by the image display element 108 are $Q_1(x1, y1)^T, Q_2(x2, y2)^T, \ldots, Q_9(x9, y9)^T$, respectively. The coordinates are, for example, a number of a pixel located at a center of each point. Further, the center points P of the cornea 302 of the user 300 when the user 300 gazes at the points Q1 to Q9 are labeled $P_1$ to $P_9$. In this case, the coordinates of the points P1 to P9 in the two-dimensional coordinate system 306 are $P_1(X1, Y1)^T, P_2(X2, Y2)^T, \ldots, P_9(X9, Y9)^T$. T represents a transposition of a vector or a matrix.

A matrix M with a size of 2×2 is defined as Equation (1) below.

$$M = \begin{pmatrix} m_{11} & m_{12} \\ m_{21} & m_{22} \end{pmatrix} \quad (1)$$

In this case, when the matrix M satisfies Equation (2) below, the matrix M is a matrix for projecting the gaze direction of the user 300 onto an image plane that is displayed by the image display element 108.

$$Q_N = MP_N (N=1, \ldots, 9) \quad (2)$$

When Equation (2) is written specifically, Equation (3) below is obtained.

$$\begin{pmatrix} x_1 & x_2 & \ldots & x_9 \\ y_1 & y_2 & \ldots & y_9 \end{pmatrix} = \begin{pmatrix} m_{11} & m_{12} \\ m_{21} & m_{22} \end{pmatrix} \begin{pmatrix} X_1 & X_2 & \ldots & X_9 \\ Y_1 & Y_2 & \ldots & Y_9 \end{pmatrix} \quad (3)$$

By transforming Equation (3), Equation (4) below is obtained.

$$\begin{pmatrix} x_1 \\ x_2 \\ \vdots \\ x_9 \\ y_1 \\ y_2 \\ \vdots \\ y_9 \end{pmatrix} = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix} \begin{pmatrix} m_{11} \\ m_{12} \\ m_{21} \\ m_{22} \end{pmatrix} \quad (4)$$

Here, $$\text{If } y = \begin{pmatrix} x_1 \\ x_2 \\ \vdots \\ x_9 \\ y_1 \\ y_2 \\ \vdots \\ y_9 \end{pmatrix}, A = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix}, x = \begin{pmatrix} m_{11} \\ m_{12} \\ m_{21} \\ m_{22} \end{pmatrix},$$

Equation (5) below is obtained:

$$y = Ax \quad (5)$$

In Equation (5), elements of the vector y are known since these are coordinates of the points $Q_1$ to $Q_9$ that are displayed on the image display element 108 by the gaze detection unit 202. Further, the elements of the matrix A can be acquired since the elements are coordinates of a vertex P of the cornea 302 of the user 300. Thus, the gaze detection unit 202 can acquire the vector y and the matrix A. A vector x that is a vector in which elements of a transformation matrix M are arranged is unknown. Since the vector y and matrix A are known, an issue of estimating matrix M becomes an issue of obtaining the unknown vector x.

Equation (5) becomes the main issue to decide when the number of equations (that is, the number of points Q presented to the user 300 by the gaze detection unit 202 at the time of calibration) is larger than the number of unknown numbers (that is, the number 4 of elements of the vector x). Since the number of equations is nine in the example illustrated in Equation (5), Equation (5) is the main issue to decide.

An error vector between the vector y and the vector Ax is defined as vector e. That is, e=y−Ax. In this case, a vector $x_{opt}$ that is optimal in the sense of minimizing the sum of squares of the elements of the vector e can be obtained from Equation (6) below.

$$x_{opt} = (A^T A)^{-1} A^T y \quad (6)$$

Here, "−1" indicates an inverse matrix.

The gaze detection unit 202 uses the elements of the obtained vector $x_{opt}$ to constitute the matrix M of Equation (1). Accordingly, using the coordinates of the vertex P of the cornea 302 of the user 300 and the matrix M, the gaze detection unit 202 estimates a point at which the right eye of the user 300 is gazing in the moving image displayed by the image display element 108 according to Equation (2). Here, the gaze detection unit 202 further receives distance information between the eye of the user and the image display element 108 from the head mounted display 100 and corrects an estimated coordinate value at which the user gazes according to the distance information. It should be noted that a deviation in the estimation of a gaze position according to the distance between the eye of the user and the image display element 108 may be ignored as an error range. Accordingly, the gaze detection unit 202 can calculate a right-eye gaze vector connecting the gaze point of the right eye on the image display element 108 and the vertex of the cornea of the right eye of the user. Similarly, the gaze detection unit 202 can calculate a left-eye gaze vector connecting the gaze point of the left eye on the image display element 108 and the vertex of the cornea of the left eye of the user. It should be noted that it is possible to specify the gazing point of the user on the two-dimensional plane with the gaze vector of only one eye, and calculate depth direction information of the gaze point of the user by obtaining the gaze vectors of both eyes. Thus, the gaze detection device 200 can specify the gaze point of the user. It should be noted that the method of specifying the gaze point shown herein is merely an example, and a gaze point of the user may be specified using a different method.

The determination unit 203 determines whether or not the motion of the user acquired from the head mounted display 100 via the second communication unit 22 satisfies a predetermined "switching condition" in which the user does not recognize switching between the images even when the moving image displayed on the display unit 121 is switched from first moving image data to second moving image data which is different from the first moving image data and of which a story is developed from the first moving image. That "the story is developed" refers to the fact that a flow of story of the moving image is changed to a different flow herein.

Here, when a predetermined "determination condition" is satisfied, the determination unit 203 may determine whether or not the "switching condition" is satisfied. When the user views a specific place in the moving image displayed on the display unit 121, the determination unit 203 determines that the "determination condition" for start of the determination process is satisfied and determines whether or not the "switching condition" is satisfied. For example, it is said that the "determination condition" is satisfied when the user views a specific place continuously for a predetermined time or more or when the user views a specific place for a total predetermined time or more within a certain time. The "specific place" is a range that is identified by coordinates or a plurality of sets of coordinates.

FIG. 7A is an example of the determination condition data 212 regarding the determination condition. For example, in the image display system 1, when a condition "the user views the region A" is satisfied while certain first moving image data is displayed on the display unit 121, switching to an image A as the second moving image data then occurs. Further, in the image display system 1, when a condition "the user views the region B" is satisfied while the first moving image data is displayed on the display unit 121, switching to a moving image B as the second moving image data then occurs. It should be noted that, in FIG. 7A, there are two patterns, that is, a case of switching to the moving image A as the second moving image and a case of switching to the moving image B as the second moving image, but the present invention is not limited thereto. For example, the second moving image to be switched may be one pattern of only the moving image A or may have a number of patterns.

Further, the image display system 1 switches from the first moving image data to the second moving image data at a timing when it is determined that the "switching condition" in which it is determined that the user does not recognize switching between the images even when switching from the first moving image data to the second moving image data occurs is satisfied, instead of switching to the second moving image data immediately after the user views the region A or the region B.

Further, although not illustrated in FIG. 7A, when a plurality of conditions are satisfied, it may be determined that the "switching condition" is satisfied. For example, when the user views the region A and views the region B, the image display system 1 may then switch to the moving image C. In this case, the image display system 1 switches to the moving image C when the user views the region B after viewing the region A, but the image display system 1 may switch to the moving image D when the user views the region A after viewing the region B.

For example, the determination unit 203 determines whether or not the motion of the gaze detected by the gaze detection unit 202 satisfies the "switching condition". That is, when the user gazes at one point, the user easily notices that the image has been switched. On the other hand, when a position of the gaze is not fixed, the user does not easily notice that the image has been switched. Therefore, the gaze detection device 200 determines whether or not the image is to be switched according to a degree of motion of the gaze of the user.

Therefore, for example, the "switching condition" is a condition for determining that the moving image to be displayed on the display unit 121 is switched from the first moving image data to the second moving image data when a total moving distance according to the motion of the gaze of the user detected by the gaze detection unit 202 is equal to or greater than a predetermined value within a predetermined time or when it is detected that the user is viewing a plurality of places separate by a predetermined distance or more within a predetermined time.

Specifically, (1) when the gaze detection device 200 detects coordinates at which the user gazes in the moving image at a certain time t0, the gaze detection device 200 stores the coordinates C0

(2) When the gaze detection device 200 detects new coordinates at which the user gazes in the moving image at t1 after a predetermined time from t0, the gaze detection device 200 stores the coordinates C1.

(3) An amount of movement M of the coordinates C1 from the coordinates C0 is obtained, and a movement speed S [°/sec] of the motion of the gaze of the user is obtained using a difference time (t1-t0) between t0 and t1, as shown in the following equation.

$$S = 2 \operatorname{atan}\left(\frac{M}{2L}\right) / (t1 - t0) \qquad [\text{Math. 5}]$$

Here, L is an optical distance between the display and the eyeball.

(4) When the speed S exceeds a predetermined value, the time t1-t0 is added as a movement time Ti to an addition value Ta, and when the speed S does not exceed the predetermined value, the movement time Ti is cleared to 0.

(5) (1) to (4) are repeated during a predetermined "switching period" determined as a scene change period in advance. When the addition value Ta of the movement time Ti exceeds the predetermined threshold value, the gaze of the user is regarded as being not determined, and scene change is performed. That is, the moving image is switched.

For example, when the gaze is moving at a speed of 60°/sec, a moving field of view is regarded as being sufficiently narrow, and switching of the moving image is considered at a timing when this speed continues for 0.5 seconds. When the switching period is 3.3 seconds and coordinates of the gaze of the user can be detected at 60 Hz, sampling can be performed approximately 200 times (3.3 sec/(1/60 Hz)=198 times). When the gaze speed is detected as S≥60°/sec 30 consecutive times (0.5 sec/(1/60 Hz)=30 times) at the time of this sampling, a total movement time Ta becomes 0.5, and this condition is regarded as being satisfied. It can be determined that the switching condition is satisfied.

Further, for example, when the determination unit 203 acquires the motion of the head of the user detected by the motion sensor 125 from the head mounted display 100 via the second communication unit 22, the determination unit 203 determines whether or not the motion of the head of the user satisfies the "switching condition." That is, when the user is stationary, the user easily notices that the image has been switched. On the other hand, when the motion of the user is intense to some extent, it is difficult for the user to notice that the image has been switched. Therefore, the gaze detection device 200 determines whether or not the image is switched according to the motion of the head of the user that can be detected by the head mounted display 100.

Therefore, for example, the "switching condition" is a condition that, when the amount of movement of the user, that is, the motion of the user's head within a predetermined time, exceeds a predetermined value, it is determined that the moving image to be displayed on the display unit 121 is switched from the first moving image data to the second moving image data.

Specifically, (1) when a rotation angle (roll, pitch, and yaw) that is a posture of the head mounted display 100 mounted on the head of the user detected by the motion sensor 125 is input from the head mounted display 100 at a certain time t0, the gaze detection device 200 stores a posture R0 thereof. R0 is a three-dimensional vector quantity.

(2) When a new posture of the head mounted display 100 is input from the head mounted display 100 at t1 which is a predetermined time after t0, the gaze detection device 200 stores a posture R1 thereof. R1 is a three-dimensional vector quantity.

(3) A three-dimensional vector M which is the amount of movement of the posture R1 from the posture R0 is obtained and divided by a difference time (t1-t0) between t0 and t1 to thereby obtain an angular velocity (M/(t1-t0)) of rotation of the head mounted display 100 mounted on the user. Alternatively, when a gyro sensor is included in the head mounted display 100, the angular velocity obtainable from the gyro sensor can be used as a value of S as it is.

(4) The magnitude of the angular velocity vector S is a one-dimensional amount with the L2 norm $\|S\|$ or the like, and when a value thereof exceeds a predetermined value, the time of t1-t0 is added as the movement time Ti to the addition value Ta, and when the value does not exceed the predetermined value, the movement time Ti is cleared to 0.

(5) (1) to (4) are repeated during the predetermined "switching period," and when the addition value Ta of the movement time Ti exceeds the predetermined threshold value, the gaze of the user is regarded as not being determined and the scene change is performed. That is, the moving image is switched.

For example, when the head of the user is moving at a speed of 60°/sec, the moving field of view is regarded as being sufficiently narrow, and switching of the moving image is considered at a timing when this speed continues for 0.5 seconds. When it is assumed that the switching period is 3.3 seconds and the detection of the angular velocity of the head mounted display 100 can be performed at 60 Hz, sampling can be performed approximately 200 times (3.3 sec/(1/60 Hz)=198 times). At the time of this sampling, when the magnitude of the angular velocity $\|S\|$≥60°/sec is detected continuously 30 times (0.5 sec/(1/60 Hz)=30 times), the total movement time Ta becomes 0.5, and this condition is regarded as being satisfied. It can be determined that the switching condition is satisfied. Here, $\|S\|$ can be calculated as a value obtained by squaring the angular velocity of roll, pitch, and yaw and taking a square root.

Further, for example, when the determination unit 203 acquires the position of the head of the user detected by the position sensor 126 from the head mounted display 100 via the second communication unit 22, the determination unit 203 determines whether or not the position of the head of the user satisfies the "switching condition." That is, as described, when the user is stationary, the user easily notices that the image has been switched. On the other hand, when the motion of the user is intense to some extent, it is difficult for the user to notice that the image has been switched. Therefore, the gaze detection device 200 determines whether or not the image is switched according to the motion of the head of the user that can be detected by the head mounted display 100.

Therefore, for example, the "switching condition" is a condition that, when the amount of movement of the user, that is, the motion of the user's head within a predetermined time exceeds a predetermined value, it is determined that the moving image to be displayed on the display unit 121 is switched from the first moving image data to the second moving image data.

Specifically, (1) when a three-dimensional coordinate position (x, y, z) that is a position of the head mounted display 100 mounted on the head of the user detected by the position sensor 126 is input from the head mounted display 100 at a certain time t0, the gaze detection device 200 stores the coordinate position R0. R0 is a three-dimensional vector quantity.

(2) When a new position of the head mounted display 100 is input from the head mounted display 100 at t1 which is a predetermined time after t0, the gaze detection device 200 stores a coordinate position R1 thereof. R1 is a three-dimensional vector quantity.

(3) The amount of movement M which is the coordinate position R1 from the coordinate position R0 is obtained and divided by a difference time (t1-t0) between t0 and t1 to thereby obtain a three-dimensional vector S(M/(t1-t0)) of a movement speed of the position of the head mounted display 100 mounted on the user.

(4) The magnitude of the movement speed S is a one-dimensional amount with the L2 norm $\|S\|$ or the like, and when a value thereof exceeds a predetermined value, the time of t1-t0 is added as the movement time Ti to the addition value Ta, and when the value does not exceed the predetermined value, the movement time Ti is cleared to 0.

(5) (1) to (4) are repeated during the predetermined "switching period," and when the addition value Ta of the movement time Ti exceeds the predetermined threshold value, the gaze of the user is regarded as not being determined and the scene change is performed. That is, the moving image is switched.

For example, when the head of the user is moving at a speed of 10 cm/sec, the moving field of view is regarded as being sufficiently narrow, and switching of the moving image is considered at a timing when this speed continues for 0.5 seconds. When it is assumed that the switching period is 3.3 seconds and the detection of the angular velocity of the head mounted display 100 can be performed at 60 Hz, sampling can be performed approximately 200 times (3.3 sec/(1/60 Hz)=198 times). At the time of this sampling, when the speed magnitude $\|S\| \geq 10$ cm/sec is detected continuously 30 times (0.5 sec/(1/60 Hz)=30 times), the total movement time Ta becomes 0.5, and this condition is regarded as being satisfied. It can be determined that the switching condition is satisfied. Here, $\|S\|$ can be calculated as a value obtained by squaring a speed of (x, y, z) in a three-dimensional coordinate space and taking a square root.

In this case, when the scene of the moving image displayed on the display unit 121 is a predetermined "switching period," the determination unit 203 determines whether or not the "switching condition" is satisfied. That is, the timing at which switching from the first moving image data to the second moving image data is possible is determined in advance according to the story. Therefore, the determination unit 203 does not need to constantly determine the "switching condition" and may determine the "switching condition" only in the "switching period," which is a timing at which switching from the first moving image data to the second moving image data is possible.

When the determination unit 203 determines that the "switching condition" is satisfied, the switching unit 204 switches the moving image displayed on the display unit 121 from the first moving image data to the second moving image data. In this case, the switching unit 204 switches the moving image from the image data 211 stored in the storage device 21 to a moving image with a pattern associated with the determination result of the determination unit 203.

The difference calculation unit 205 obtains the difference between the first moving image data and the second moving image data. Here, the difference calculation unit 205 obtains a difference between the first moving image data and the second moving image data while the switching from the first moving image data to the second moving image data is possible.

Here, when the determination unit 203 determines that the "determination condition" is satisfied, the display processing unit 201 starts reproduction of the second moving image data in the background. Therefore, the difference calculation unit 205 compares the first moving image data being displayed on the head mounted display 100 with the second moving image data being reproduced in the background to obtain the difference.

The determination unit 203 determines whether or not the difference calculated by the difference calculation unit 205 matches the "switching condition" in which even when the moving image displayed on the display unit 121 is switched from the first moving image data to the second moving image data different from the first moving image, the user does not recognize the switching between the images. The "switching condition" in this case is a condition for determining that the image is switched in which it is made difficult for the user to notice switching even when the first moving image is switched to the second moving image in a case in which the difference is within a predetermined range. For example, when a change in the moving image is small to some extent, the user is regarded as not gazing at a certain place, but moving his or her gaze, and the moving image is switched. In addition, when the change in the moving image is large to some extent, the user is regarded as not gazing at a certain place, but moving his or her gaze greatly according to the change, and the moving image is switched.

Specifically, (1) the gaze detection device 200 calculates (1) a feature amount of the first moving image and a feature amount of the second moving image. An example of a method of obtaining the feature amount includes a method of (a) adding luminance values of an image at a certain time t0 and an image at t1 after a predetermined time for the first moving image and the second moving image, (b) obtaining feature points using an algorithm such as Oriented Fast and Rotated BRIEF (ORB) or accelerated KAZE (AKAZE) for the first moving image and the second moving image and obtaining a sum of root-mean-squares of amounts of movement of the feature points from the image at the certain time t0 to t1 that is after a predetermined time, and (c) obtaining the amount of movement from an optical flow from the certain time t0 to the time t1 which is after a predetermined time for the first moving image and the second moving image.

(2) When the obtained value V does not exceed a predetermined value, a time t1-t0 is added as a movement time Ti to the addition value Ta, and when the obtained value V exceeds the predetermined value, Ti is cleared.

(3) (1) to (2) are repeated for a predetermined "switching period," and when the addition value Ta of the movement time Ti exceeds a predetermined upper limit threshold value or when the addition value Ta falls below a lower limit threshold value, a scene change is performed. That is, the moving image is switched. A case in which the addition value Ta exceeds the upper limit threshold value means that a change in an object in the moving image is extremely large, and when the object is intensively changing so that the change cannot be traced with the eyes of the user, it is difficult for the user to recognize switching even when the switching is performed. In addition, a case in which the value falls below the lower limit threshold value means that the change in the object in the moving image is small and the object is substantially stationary.

For example, switching the moving image at a timing when the video changes greatly continuously for 0.5 second is considered. When it is assumed that the switching period is 3.3 seconds and the calculation of the feature amount is performed at 60 Hz, approximately 200 calculations are possible during the switching period (3.3 sec/(1/60 Hz)=198 times). When it is detected that the amount of change in the feature amount exceeds the threshold value continuously 30 times (0.5 sec/(1/60 Hz)=30 times) during this period, the total movement time Ta becomes 0.5, and this condition is regarded as being satisfied. It can be determined that the switching condition is satisfied.

For example, the switching condition described above is stored in the storage device 21 as the switching condition data 213 as shown by way of example in FIG. 7B. Specifically, the switching condition data 213 includes a switchable "timing" and a "threshold value" that is used as a switching condition. In the example illustrated in FIG. 7B, the switchable timing is a "period α." Further, the switching condition includes a "first threshold value" that is used for a determination of the motion of the gaze detected by the gaze detection unit 202, a "second threshold value" that is used for a determination of the motion of the head of the user detected by the motion sensor 125 or the motion of the head obtained from the position detected by the position sensor 126, and a "third threshold value" that is used for a determination of an image change amount obtained by the difference calculation unit 205.

As described above, the gaze detection device 200 can determine "1. Switch when the motion of the gaze of the user or the motion of the head is intense," "2. Switch when a difference between moving images is extremely large or small," or the like as the "switching condition." Further, the gaze detection device 200 can determine "3. Switch according to a combination of the above conditions 1 and 2" as "switching condition."

<Operation>

Figure 8:
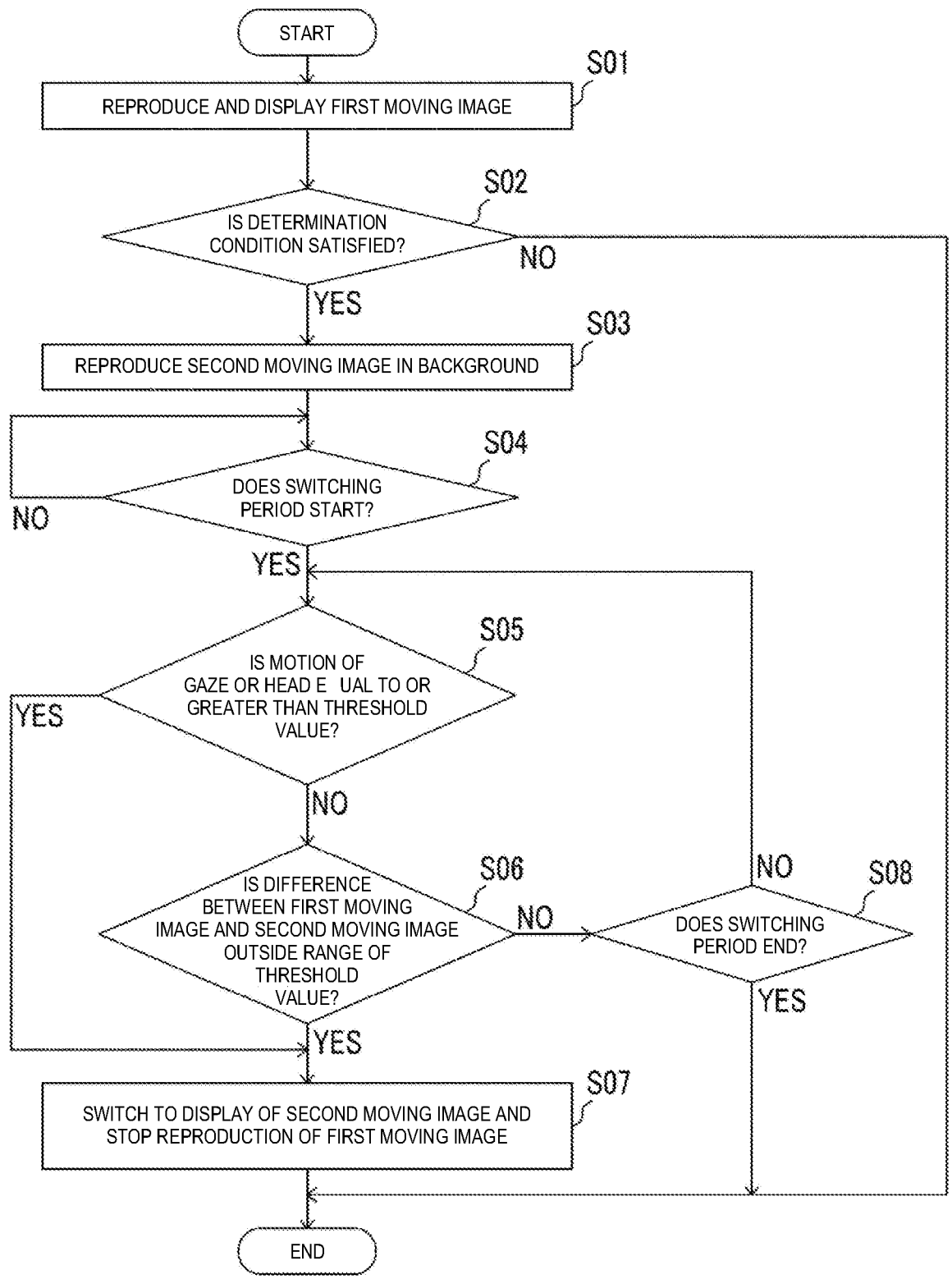
FIG. 8 is a flowchart illustrating an operation of the image display system.

Hereinafter, an operation of the image display system 1 will be described with reference to the flowchart illustrated in FIG. 8. In the image display system 1, first, a first moving image is reproduced and displayed (S01).

During reproduction of the first moving image data, the determination unit 203 determines whether or not the determination condition is satisfied (S02). For example, in the example of the determination condition data 212 illustrated in FIG. 7A, a determination is made that the condition is satisfied when "region A is viewed" or "region B is viewed" in a certain time range of the moving image. FIG. 9A illustrates an example of the moving image displayed on the display unit 121. In the example of FIG. 9A, a region on the upper side of the door is set as region A, and a region on the lower side of the door is set as region B. In the example of the determination condition data 212 of FIG. 7A and the example of the moving image data of FIG. 9A, when the user views the region on the upper side of the door (region A), the moving image A is selected as the second moving image data. On the other hand, when the user views the region on the lower side of the door (region B), the moving image B is selected as the second moving image data.

When the image display system 1 determines that the determination condition is satisfied (YES in S02), the image display system 1 starts the reproduction of the second moving image in the background (S03). Specifically, the image display system 1 starts the reproduction of the second moving image in the background with the start of the switching period, as shown in the time chart of FIG. 10A. In the example described above with reference to FIGS. 7A and 9A, when the user views the region A, the moving image A is set as the second moving image, and background reproduction is started. On the other hand, when the user views the region B, the moving image B is set as the second moving image, and background reproduction is started. The switching period is stored, for example, in the switching condition data 213. In the example of the switching condition data 213 illustrated in FIG. 7B, the period α is set as the switching period.

In addition, when the switching period starts (YES in S04), the image display system 1 determines whether or not the switching condition is satisfied, that is, determines whether a motion of the gaze of the user is equal to or greater than the threshold value or whether a motion of the head of the user is equal to or greater than a threshold value (S05).

When the motion of the gaze of the user is not equal to or greater than the threshold value and the motion of the head of the user is not equal to or greater than the threshold value, the image display system 1 determines whether or not the switching condition is satisfied, that is, whether or not a difference between the first moving image and the second moving image is outside a range of a threshold value (S06).

When the motion of the gaze of the user is equal to or greater than the threshold value, when the motion of the head of the user is equal to or greater than the threshold value, or when the difference between the first moving image and the second moving image is outside the range of the threshold value (YES in S05 or YES in S06), a display on the display unit 121 is switched from the first moving image to the second moving image, and the reproduction of the first moving image is stopped (S07). For example, when the moving image A is selected as the second image in the example illustrated in FIGS. 7A and 9A, the moving image A as illustrated in FIG. 9B is displayed as the second image. Further, when the moving image B is selected as the second image, the moving image B as illustrated in FIG. 9C is displayed as the second image.

When the first moving image and the second moving image are within the range of the threshold value (NO in S07), the processes of steps S05 to S06 are repeated until the switching period ends.

Further, the switching condition data 213 of FIG. 7C and the time chart of FIG. 10B are examples in which the first switching period (period α) and the second switching period (period β) are set twice. Thus, when a plurality of switching periods are set, the processes of steps S04 to S06 are repeated. In the case in which the switching period is set a plurality of times, the image is switched during the second switching period when the switching condition is satisfied in the second switching period even when the switching condition is not satisfied in the first switching period, as illustrated in FIG. 10B.

It should be noted that, in the above-described example, when the motion of the gaze is equal to or greater than the threshold value or when the motion of the head is equal to or greater than the threshold value, the display is switched to display of the second moving image and the reproduction of the first moving image is stopped. Here, it is preferable for the present invention to be able to be realized, for example, for a head mounted display 100 that does not include the imaging unit 124 for detecting the gaze or a head mounted display 100 that does not include the motion sensor 125 or the position sensor 126 for detecting the motion. Therefore, the determination in the determination unit 203 is determined according to the configuration of the head mounted display 100. That is, when the image display system 1 cannot detect the gaze, the motion of the gaze is not used for the determination. Further, when the image display system 1 cannot perform motion detection or position detection, the motion of the head is not used for the determination.

Thus, in the image display system 1 according to the embodiment, the story selected from the stories of a plurality of patterns is developed according to a situation of the user. Accordingly, the user can enjoy the story suitable for the user. Further, when the story is switched, the switching is performed so that the user does not notice the switching between images according to a state of the gaze of the user, a state of the motion of the head, a state of the image, and the like. Accordingly, the user can concentrate on and enjoy the moving images displayed on the image display system 1 without feeling stress caused by switching between the images.

<Supplements>

It is apparent that the image display system 1 is not limited to the above-described configuration or the like but may be realized by another scheme for realizing the spirit of the invention. Hereinafter, other examples which can be included as the spirit of the present invention will be described.

(1) There is one image display element 108, but the present invention is not limited thereto. The head mounted display 100 may include two image display elements including an image display element for the left eye of the user 300 and an image display element for the right eye of the user 300, which may be driven separately. Accordingly, fine control such as focus adjustment according to visual acuity of the left and right eyes of the user 300 can be performed.

(2) In order to detect the gaze of the user 300, the video reflected by the hot mirror 112 is imaged as a scheme of imaging the eyes of the user 300. Here, the eyes of the user 300 may be directly imaged without passing through the hot mirror 112.

(3) The scheme related to gaze detection is an example, and the gaze detection method using the head mounted display 100 and the gaze detection device 200 is not limited thereto.

First, the example in which a plurality of infrared light sources that radiate near-infrared light as invisible light are provided is shown, but a scheme of irradiating the eye of the user with near-infrared light is not limited thereto. For example, a configuration in which pixels including sub pixels that emit near infrared light are provided for pixels constituting the image display element 108 of the head mounted display 100 may be adopted, the sub pixels that emit near infrared light may be caused to selectively emit the near infrared light, and the eyes of the user may be irradiated with the near-infrared light. Further, alternatively, a configuration in which a retinal projection display is included in the head mounted display 100 instead of the image display element 108, and pixels that emit light with near infrared light color are included in an image displayed on the retinal projection display and projected on a retina of the user to realize irradiation with near infrared light may be adopted. Even in the case of the image display element 108 or the case of the retinal projection display, sub-pixels that emit near-infrared light may be periodically changed.

In addition, the above-described eye-gaze detection algorithm is not limited to the above-described scheme, and other algorithms may be used as long as the gaze detection can be realized.

Figure 11:
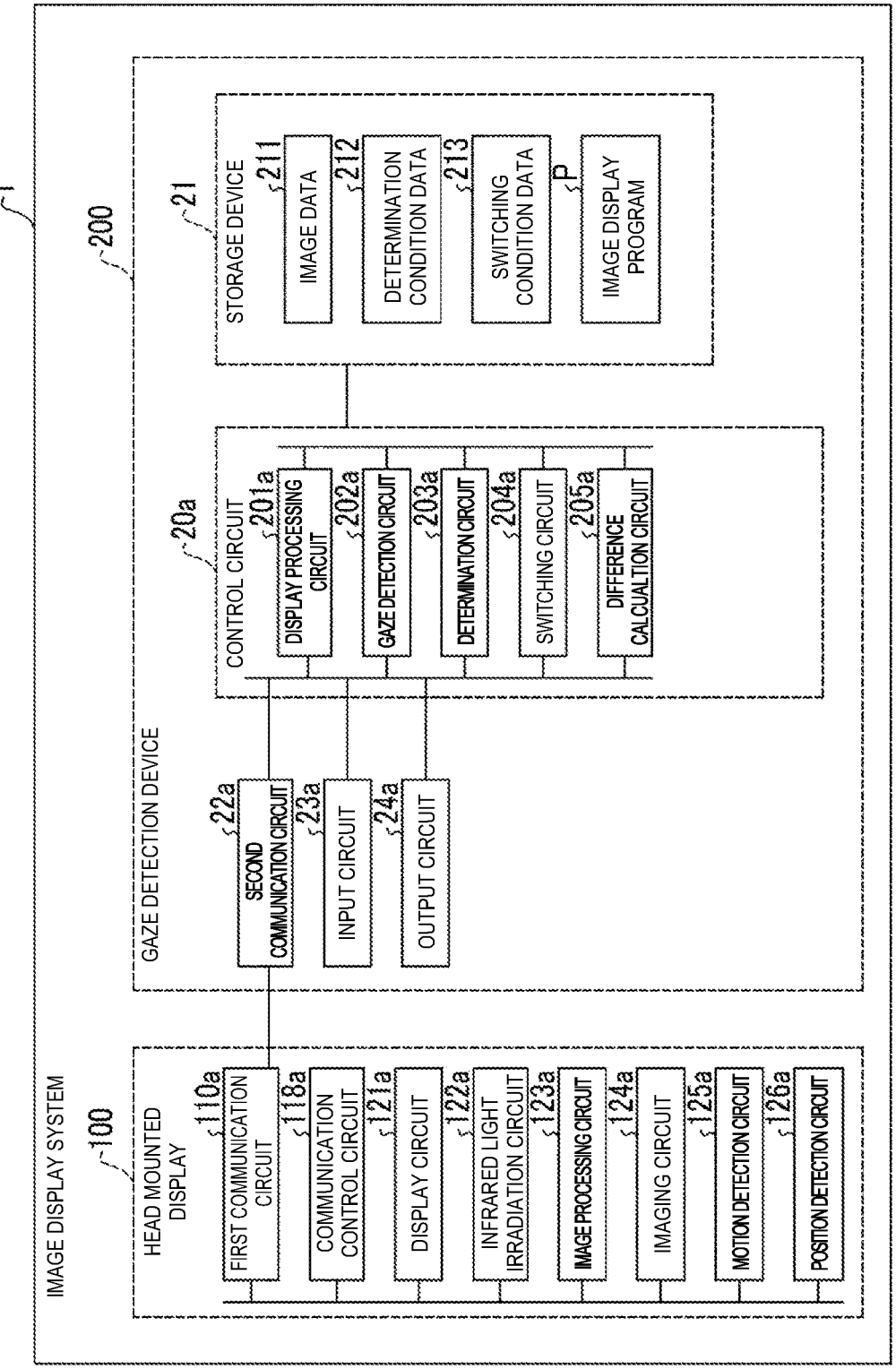
FIG. 11 is a circuit diagram illustrating a circuit configuration of the image display system.

(4) Further, although changing of the advertisement displayed on the head mounted display 100 is realized by the processors of the head mounted display 100 and the gaze detection device 200 executing the image display program P and the like, this may be realized by a logical circuit (hardware) form of an integrated circuit (an integrated circuit (IC) chip, large scale integration (LSI), or the like) or a dedicated circuit in the gaze detection device 200. Further, the circuit may be realized by one or a plurality of integrated circuits, or the functions of the plurality of functional units described above may be realized by one integrated circuit. The LSI may be called VLSI, super LSI, ultra LSI, or the like according to an integration difference. That is, as illustrated in FIG. 11, the head mounted display 100 may include a first communication circuit 110*a*, a communication control circuit 118*a*, a display circuit 121*a*, an infrared light irradiation circuit 122*a*, an image processing circuit 123*a*, an imaging circuit 124*a*, a motion detection circuit 125*a*, and a position detection circuit 126*a*, and respective functions thereof are the same as those of respective units having the same name described above. Further, the gaze detection device 200 may include a second communication circuit 22*a*, an input circuit 23*a*, an output circuit 24*a*, a display processing circuit 201*a*, a gaze detection circuit 202*a*, a determination circuit 203*a*, a switching circuit 204*a*, and a difference calculation circuit 205*a*, and respective functions thereof are the same as those of respective units having the same name described above.

Further, the image display program P may be recorded on a processor-readable recording medium, and the recording medium may be a "non-transitory tangible medium" such as a tape, a disk, a card, a semiconductor memory, or a programmable logic circuit. Further, the image display program P may be supplied to the processor through any transmission medium (such as a communication network or broadcast waves) capable of transmitting the image display program P. The present invention can also be realized in the form of a data signal embodied in a carrier wave, in which the image display program P is implemented by electronic transmission.

It should be noted that the image display program P may be installed using, for example, a script language such as ActionScript, JavaScript (registered trademark), Python, or Ruby, a compiler language such as a C language, C ++, C#, Objective-C, or Java (registered trademark), or the like.

(5) The respective configurations and respective supplements may be appropriately combined.

The present invention has an effect of being able to provide a moving image with story development according to users, and can be used for various image display devices, head mounted displays, and the like.

EXPLANATION OF REFERENCES

1 Image display system
100 Head mounted display
118 First communication unit
121 Display unit
122 Infrared light irradiation unit
123 Image processing unit
124 Imaging unit
125 Motion sensor
126 Position sensor
200 Gaze detection device
201 Display processing unit
202 Gaze detection unit
203 Determination unit
204 Switching unit
205 Difference calculation unit
21 Storage device
211 Image data
212 Determination condition data
213 Switching condition data
22 Second communication unit (acquisition unit)
23 Input device
24 Output device

What is claimed is:
1. An image display system comprising:
a display unit that displays a first image showing a first scene at a place;
an acquisition unit that acquires a motion of a user;
a determination unit that
determines that the first image is to be switched when a predetermined determination condition is satisfied, and
if the first image is determined to be switched, determines that the first image is switchable according to a degree of the motion of a gaze of the user from the first image so that the user does not recognize the switching the first image to a second image, and a switching unit that switches the first image to the second image which is different from the first image and of which a story is developed from the first image at a timing when the first image is determined switchable and an attention of the user is not focused on the first and second images.

2. The image display system according to claim 1, wherein the degree of the motion of the gaze of the user includes a total moving distance according to the motion of the gaze of the user, and wherein the determination unit determines that the first image is switchable when the total moving distance is greater than a predetermined threshold.

3. The image display system according to claim 1, wherein the degree of the motion of the gaze of the user includes a distance between a plurality of places which the user viewed, and wherein the determination unit determines that the first image is switchable when the distance is greater than a predetermined threshold.

4. The image display system according to claim 1, wherein the second image varies according to a specific region at which the user gazes in the first image, and
wherein the image display system starts background reproduction of the second image when the second image is determined according to the specific region and a switching period starts.

5. The image display system according to claim 4, wherein the determination unit determines that the first image is switchable when a total movement time interval of the gaze exceeds a predetermined threshold value, a speed of the gaze exceeding a predetermined speed during the total movement time interval.

6. An image display system comprising:
a display unit that displays a first image at a specific region;
an acquisition unit that acquires a motion of a user;
a determination unit that
determines that the first image showing a first scene is to be switched when a predetermined determination condition is satisfied, and
if the first image is determined to be switched, determines that the first image is switchable when the gaze of the user is not stable, wherein the determination unit determines that the gaze of the user is not stable when a speed of the motion of the gaze of the user exceeds a predetermined speed, and
a switching unit that directly switches the first image to the second image on the display unit, the second image showing a second scene which is different from the first scene at a timing when the first image is determined switchable.

7. The image display system according to claim 6, wherein the determination unit determines the first image is switchable when a number of times that the speed of the motion of the gaze of the user exceeds the predetermined speed exceeds a predetermined threshold value.

8. The image display system according to claim 6, wherein the determination unit determines the first image is switchable when a duration while the speed of the motion of the gaze of the user exceeds the predetermined speed exceeds a predetermined threshold value.

9. An image display system comprising:
a display unit that displays a first image showing a first scene at a specific region;
an acquisition unit that acquires a motion of a user;
a determination unit that
determines that the first image is to be switched when a predetermined determination condition is satisfied, and
if the first image is determined to be switched, determines that the first image is switchable when the gaze of the user is not stable, wherein the determination unit determines that the gaze of the user is not stable when a speed of a motion of the head of the user exceeds a predetermined speed; and
a switching unit that directly switches the first image to the second image on the display unit, the second image showing a second scene which is different from the first scene when the first image is determined switchable.

* * * * *